United States Patent
Wang et al.

(10) Patent No.: US 10,171,355 B2
(45) Date of Patent: Jan. 1, 2019

(54) DATA PACKET SENDING METHOD AND APPARATUS

(71) Applicant: HUAWEI TECHNOLOGIES CO., LTD., Shenzhen (CN)

(72) Inventors: Jiao Wang, Beijing (CN); Xiuchu Zhao, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 87 days.

(21) Appl. No.: 15/376,206

(22) Filed: Dec. 12, 2016

(65) Prior Publication Data
US 2017/0093706 A1    Mar. 30, 2017

Related U.S. Application Data

(63) Continuation of application No. PCT/CN2014/080325, filed on Jun. 19, 2014.

(51) Int. Cl.
*H04L 12/28* (2006.01)
*H04L 12/721* (2013.01)
(Continued)

(52) U.S. Cl.
CPC .............. *H04L 45/72* (2013.01); *H04L 45/02* (2013.01); *H04L 45/12* (2013.01); *H04L 45/42* (2013.01); *H04L 45/64* (2013.01)

(58) Field of Classification Search
None
See application file for complete search history.

(56) References Cited

U.S. PATENT DOCUMENTS 8,094,575 B1 * 1/2012 Vadlakonda .......... H04L 45/123
370/252
9,008,087 B2    4/2015 Lambeth et al.
(Continued)

FOREIGN PATENT DOCUMENTS

CN        103117925 A      5/2013
CN        103812930 A      5/2014
WO    WO 2013/185715 A1  12/2013

OTHER PUBLICATIONS

International Search Report dated Mar. 24, 2015 in PCT/CN2014/080325 (with English translation of Category of Cited Documents).
(Continued)

*Primary Examiner* — Eunsook Choi
(74) *Attorney, Agent, or Firm* — Oblon, McClelland, Maier & Neustadt, L.L.P.

(57) ABSTRACT

A data packet sending method and apparatus. The method includes: sending a policy request message that carries header information of a data packet to one or more controllers when a forwarding table of a first switch does not have a forwarding entry that matches the header information of the data packet; receiving a policy response message sent by a controller, where the policy response message includes a controller-determined forwarding path; selecting a forwarding path from received controller-determined forwarding paths; informing the selected forwarding path to a second switch on the selected forwarding path to forward the data packet after receiving the data packet, where the second switch is a switch besides the first switch on the selected forwarding path; and forwarding the data packet according to the selected forwarding path.

20 Claims, 6 Drawing Sheets

(51) Int. Cl.
*H04L 12/751* (2013.01)
*H04L 12/715* (2013.01)
*H04L 12/717* (2013.01)

(56) References Cited

U.S. PATENT DOCUMENTS

2008/0285562 A1* 11/2008 Scott ................. G06F 15/17362
370/392
2011/0261723 A1* 10/2011 Yamato ................... H04L 45/34
370/255
2014/0153443 A1  6/2014 Carter et al.
2016/0173338 A1*  6/2016 Wolting ................ H04L 41/145
709/223
2016/0330045 A1* 11/2016 Tang ..................... H04L 12/462

OTHER PUBLICATIONS

International Search Report dated Mar. 24, 2015 in WIPO Application No. PCT/CN2014/080325.

* cited by examiner

DATA PACKET SENDING METHOD AND APPARATUS

CROSS-REFERENCE TO RELATED APPLICATIONS

This application is a continuation of International Application No. PCT/CN2014/080325, filed on Jun. 19, 2014, the disclosure of which is hereby incorporated by reference in its entirety.

TECHNICAL FIELD

The present disclosure relates to the communications field, and in particular, to a data packet sending method and apparatus.

BACKGROUND

A software-defined networking (SDN) is constituted by devices such as multiple controllers and multiple switches. When receiving a data packet, a switch searches for, according to header information of the data packet, a forwarding entry included in a forwarding table, where the header information includes address information required for sending the data packet, and the address information includes at least one or more of a source Internet Protocol (IP) address, a destination IP address, a media access control (MAC) address of a source device, a MAC address of a destination device, a virtual local area network (VLAN) identifier corresponding to the source device, and a VLAN identifier corresponding to the destination device that are required for sending the data packet. If a forwarding entry that matches the header information of the data packet is found, the data packet is forwarded according to path information recorded by the forwarding entry.

If a forwarding entry that matches the header information of the data packet is not found, the first switch (for ease of description, the switch is referred to as a first switch) sends the header information of the data packet to each controller in the SDN network. Each controller in the SDN network receives the header information that is of the data packet and sent by the first switch, computes a forwarding path for the data packet according to a network topology and the header information of the data packet, and sends the computed forwarding path to switches on the forwarding path (the switches on the forwarding path include the first switch). Each controller in the SDN network computes the forwarding path of the data packet according to the foregoing method, and sends the computed forwarding path to each switch on the forwarding path (the switches on each forwarding path include the first switch). The first switch selects one forwarding path from the received forwarding paths, and forwards, according to the forwarding path, the data packet to a device corresponding to a next hop. The device corresponding to the next hop may be a switch or a terminal. If the device is a switch, the switch selects one forwarding path from the received forwarding paths, and forwards the data packet to a device corresponding to a next hop according to the selected forwarding path. In this way, the data packet is forwarded from one switch to another switch until the data packet is sent to a terminal.

In a process of implementing the present disclosure, the inventor finds that at least the following problems exist in the prior art:

Because of a real-time difference of network statuses, different controllers may have different network topologies. Therefore, forwarding paths computed by different controllers may be different, and further forwarding paths selected by different switches may be different. Therefore, when different switches forward a data packet according to different forwarding paths, a loop may be formed, causing a data packet sending failure.

SUMMARY

To avoid forming a loop during data packet sending and ensure successful data packet sending, the present disclosure provides a data packet sending method and apparatus. The technical solutions are as follows:

According to a first aspect, a data packet sending method is provided, where the method includes:

when a forwarding table of a first switch does not have a forwarding entry that matches header information of a data packet, sending each controller a policy request message that carries the header information of the data packet, so that each controller computes a forwarding path for the data packet, where the header information includes address information required for sending the data packet;

receiving a policy response message sent by each controller, where the policy response message includes the forwarding path;

selecting one forwarding path from the received forwarding paths;

setting that a second switch uses the selected forwarding path to forward the data packet after receiving the data packet, where the second switch is any switch except the first switch on the selected forwarding path; and forwarding the data packet according to the selected forwarding path.

With reference to the first aspect, in a first possible implementation manner of the first aspect, the selecting one forwarding path from the received forwarding paths includes:

randomly selecting one forwarding path from the received forwarding paths; or selecting, from the received forwarding paths, a forwarding path sent by a controller having a shortest distance to the first switch; or selecting, from the received forwarding paths, a forwarding path that is received first.

With reference to the first possible implementation manner of the first aspect, in a second possible implementation manner of the first aspect, the selecting, from the received forwarding paths, a forwarding path that is received first includes:

determining, according to an identifier that is of the data packet and carried by the policy response message, whether the forwarding path of the data packet is received for the first time; and if the forwarding path of the data packet is received for the first time, selecting the forwarding path carried by the policy response message as the forwarding path that is received first.

With reference to the first aspect, in a third possible implementation manner of the first aspect, the policy request message carries the identifier of the data packet.

With reference to the first aspect, in a fourth possible implementation manner of the first aspect, the setting that a second switch uses the selected forwarding path to forward the data packet after receiving the data packet includes:

sending a first notification message to a controller corresponding to the selected forwarding path, where the first notification message carries a receive indication, so that the controller corresponding to the selected forwarding path sends the selected forwarding path to the second switch according to the receive indication, and the second switch uses the selected forwarding path to forward the data packet after receiving the data packet.

With reference to the first aspect, in a fifth possible implementation manner of the first aspect, the setting that a second switch uses the selected forwarding path to forward the data packet after receiving the data packet includes:

sending the selected forwarding path to the second switch, so that the second switch uses the selected forwarding path to forward the data packet after receiving the data packet.

With reference to the first aspect, in a sixth possible implementation manner of the first aspect, after the selecting one forwarding path from the received forwarding paths, the method further includes:

sending a second notification message to a controller corresponding to each unselected forwarding path, where the second notification message carries a discard indication, and the discard indication indicates that a forwarding path sent by the controller corresponding to each unselected forwarding path is not selected.

According to a second aspect, a data packet sending method is provided, where the method includes:

receiving a policy request message sent by a first switch, where the policy request message includes header information of a data packet, and the header information includes address information required for sending the data packet;

computing a forwarding path for the data packet according to a network topology and the header information of the data packet; and sending a policy response message to the first switch, where the policy response message includes the forwarding path, so that the first switch selects one forwarding path from forwarding paths sent by controllers, and sets that a switch on the selected forwarding path uses the selected forwarding path to forward the data packet after receiving the data packet.

With reference to the second aspect, in a first possible implementation manner of the second aspect, after the sending a policy response message to the first switch, the method further includes:

receiving a first notification message sent by the first switch, where the first notification message carries a receive indication; and sending the forwarding path to a second switch according to the receive indication, so that the second switch uses the forwarding path to forward the data packet after receiving the data packet, where the second switch is any switch except the first switch on the forwarding path.

With reference to the second aspect, in a second possible implementation manner of the second aspect, after the sending a policy response message to the first switch, the method further includes:

receiving a second notification message that is sent by the first switch when selecting another forwarding path except the forwarding path, where the second notification message carries a discard indication; and deleting the forwarding path according to the discard indication.

With reference to the second aspect, in a third possible implementation manner of the second aspect, the policy response message carries an identifier of the data packet, the identifier of the data packet is used by the first switch to determine whether the forwarding path is a first received forwarding path of the data packet, and the first received forwarding path of the data packet is used as the selected forwarding path.

According to a third aspect, a data packet sending apparatus is provided, where the apparatus includes:

a first sending module, configured to: when a forwarding table of a first switch does not have a forwarding entry that matches header information of a data packet, send, to each controller, a policy request message that carries the header information of the data packet, so that each controller computes a forwarding path for the data packet, where the header information includes address information required for sending the data packet:

a receiving module, configured to receive a policy response message sent by each controller, where the policy response message includes the forwarding path;

a selection module, configured to select one forwarding path from the received forwarding paths;

a setting module, configured to set that a second switch uses the selected forwarding path to forward the data packet after receiving the data packet, where the second switch is any switch except the first switch on the selected forwarding path; and a forwarding module, configured to forward the data packet according to the selected forwarding path.

With reference to the third aspect, in a first possible implementation manner of the third aspect, the selection module includes:

a first selection unit, configured to randomly select one forwarding path from the received forwarding paths; or a second selection unit, configured to select, from the received forwarding paths, a forwarding path sent by a controller having a shortest distance to the first switch; or a third selection unit, configured to select, from the received forwarding paths, a forwarding path that is received first.

With reference to the first possible implementation manner of the third aspect, in a second possible implementation manner of the third aspect, the third selection unit includes:

a determining subunit, configured to determine, according to an identifier that is of the data packet and carried by the policy response message, whether the forwarding path of the data packet is received for the first time; and a selection subunit, configured to: if the forwarding path of the data packet is received for the first time, select the forwarding path carried by the policy response message as the forwarding path that is received first.

With reference to the third aspect, in a third possible implementation manner of the third aspect, the policy request message carries the identifier of the data packet.

With reference to the third aspect, in a fourth possible implementation manner of the third aspect, the setting module includes:

a first sending unit, configured to send a first notification message to a controller corresponding to the selected forwarding path, where the first notification message carries a receive indication, so that the controller corresponding to the selected forwarding path sends the selected forwarding path to the second switch according to the receive indication, and the second switch uses the selected forwarding path to forward the data packet after receiving the data packet.

With reference to the third aspect, in a fifth possible implementation manner of the third aspect, the setting module includes:

a second sending unit, configured to send the selected forwarding path to the second switch, so that the second switch uses the selected forwarding path to forward the data packet after receiving the data packet.

With reference to the third aspect, in a sixth possible implementation manner of the third aspect, the apparatus further includes:

a second sending module, configured to send a second notification message to a controller corresponding to each unselected forwarding path, where the second notification message carries a discard indication, and the discard indication indicates that a forwarding path sent by the controller corresponding to each unselected forwarding path is not selected.

According to a fourth aspect, a data packet sending apparatus is provided, where the apparatus includes:

a first receiving module, configured to receive a policy request message sent by a first switch, where the policy request message includes header information of a data packet, and the header information includes address information required for sending the data packet;

a computation module, configured to compute a forwarding path for the data packet according to a network topology and the header information of the data packet; and a first sending module, configured to send a policy response message to the first switch, where the policy response message includes the forwarding path, so that the first switch selects one forwarding path from forwarding paths sent by controllers, and sets that a switch on the selected forwarding path uses the selected forwarding path to forward the data packet after receiving the data packet.

With reference to the fourth aspect, in a first possible implementation manner of the fourth aspect, the apparatus further includes:

a second receiving module, configured to receive a first notification message sent by the first switch, where the first notification message carries a receive indication; and a second sending module, configured to send the forwarding path to a second switch according to the receive indication, so that the second switch uses the forwarding path to forward the data packet after receiving the data packet, where the second switch is any switch except the first switch on the forwarding path.

With reference to the fourth aspect, in a second possible implementation manner of the fourth aspect, the apparatus further includes:

a third receiving module, configured to receive a second notification message that is sent by the first switch when selecting another forwarding path except the forwarding path, where the second notification message carries a discard indication; and a deletion module, configured to delete the forwarding path according to the discard indication.

With reference to the fourth aspect, in a third possible implementation manner of the fourth aspect, the policy response message carries an identifier of the data packet, the identifier of the data packet is used by the first switch to determine whether the forwarding path is a first received forwarding path of the data packet, and the first received forwarding path of the data packet is used as the selected forwarding path.

According to a fifth aspect, a data packet sending apparatus is provided, where the apparatus includes:

a processor, a memory, a bus, and a communications interface, where the memory is configured to store a computer execution instruction; the processor is connected to the memory using the bus; when the data packet sending apparatus runs, the processor executes the computer execution instruction stored by the memory, so that the data packet sending apparatus executes the method according to any one of claims 1 to 7.

According to a sixth aspect, a data packet sending apparatus is provided, where the apparatus includes:

a processor, a memory, a bus, and a communications interface, where the memory is configured to store a computer execution instruction; the processor is connected to the memory using the bus; when the data packet sending apparatus runs, the processor executes the computer execution instruction stored by the memory, so that the data packet sending apparatus executes the method according to any one of claims 8 to 11.

In the embodiments of the present disclosure, when a forwarding table of a first switch does not have a forwarding entry that matches header information of a data packet, a policy request message that carries the header information of the data packet is sent to each controller, so that each controller computes a forwarding path for the data packet, where the header information includes address information required for sending the data packet; a policy response message sent by each controller is received, where the policy response message includes the forwarding path; one forwarding path is selected from the received forwarding paths; it is set that a second switch uses the selected forwarding path to forward the data packet after receiving the data packet, where the second switch is any switch except the first switch on the selected forwarding path; and the data packet is forwarded according to the selected forwarding path. Because the first switch selects one forwarding path from the received forwarding paths, and sets the selected forwarding path on the second switch, it is ensured that the first switch and the second switch use the same forwarding path when forwarding the data packet. In this way, no loop is formed during data packet forwarding, thereby ensuring successful data packet sending.

BRIEF DESCRIPTION OF DRAWINGS

FIG. 2-1 is an architecture diagram of an SDN network according to Embodiment 2 of the present disclosure;

FIG. 2-2 is a flowchart of a data packet sending method according to Embodiment 2 of the present disclosure;

DESCRIPTION OF EMBODIMENTS

To make the objectives, technical solutions, and advantages of the present disclosure clearer, the following further describes the embodiments of the present disclosure in detail with reference to the accompanying drawings.

Embodiment 1

Figure 1:
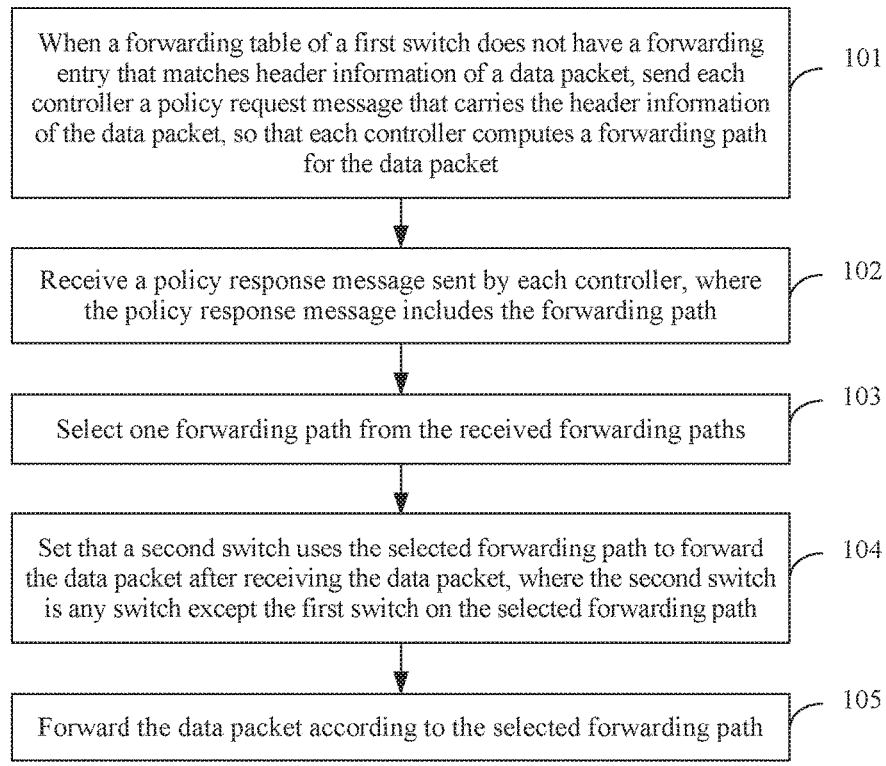
FIG. 1 is a flowchart of a data packet sending method according to Embodiment 1 of the present disclosure.

Referring to FIG. 1, this embodiment of the present disclosure provides a data packet sending method, including:

Step 101: When a forwarding table of a first switch does not have a forwarding entry that matches header information of a data packet, send, to each controller, a policy request message that carries the header information of the data packet, so that each controller computes a forwarding path for the data packet, where the header information includes address information required for sending the data packet.

Step 102: Receive a policy response message sent by each controller, where the policy response message includes the forwarding path.

Step 103: Select one forwarding path from the received forwarding paths.

Step 104: Set that a second switch uses the selected forwarding path to forward the data packet after receiving the data packet, where the second switch is any switch except the first switch on the selected forwarding path.

Step 105: Forward the data packet according to the selected forwarding path.

Preferably, the selecting one forwarding path from the received forwarding paths includes:

randomly selecting one forwarding path from the received forwarding paths; or selecting, from the received forwarding paths, a forwarding path sent by a controller having a shortest distance to the first switch; or selecting, from the received forwarding paths, a forwarding path that is received first.

Preferably, the selecting, from the received forwarding paths, a forwarding path that is received first includes:

determining, according to an identifier that is of the data packet and carried by the policy response message, whether the forwarding path of the data packet is received for the first time; and if the forwarding path of the data packet is received for the first time, selecting the forwarding path carried by the policy response message as the forwarding path that is received first.

Preferably, the policy request message carries the identifier of the data packet.

Preferably, the setting that a second switch uses the selected forwarding path to forward the data packet after receiving the data packet includes:

sending a first notification message to a controller corresponding to the selected forwarding path, where the first notification message carries a receive indication, so that the controller corresponding to the selected forwarding path sends the selected forwarding path to the second switch according to the receive indication, and the second switch uses the selected forwarding path to forward the data packet after receiving the data packet.

Preferably, the setting that a second switch uses the selected forwarding path to forward the data packet after receiving the data packet includes:

sending the selected forwarding path to the second switch, so that the second switch uses the selected forwarding path to forward the data packet after receiving the data packet.

Further, after the selecting one forwarding path from the received forwarding paths, the method further includes:

sending a second notification message to a controller corresponding to each unselected forwarding path, where the second notification message carries a discard indication, and the discard indication indicates that a forwarding path sent by the controller corresponding to each unselected forwarding path is not selected.

In this embodiment of the present disclosure, when a forwarding table of a first switch does not have a forwarding entry that matches header information of a data packet, a policy request message that carries the header information of the data packet is sent to each controller, so that each controller computes a forwarding path for the data packet, where the header information includes address information required for sending the data packet; a policy response message sent by each controller is received, where the policy response message includes the forwarding path; one forwarding path is selected from the received forwarding paths; it is set that a second switch uses the selected forwarding path to forward the data packet after receiving the data packet, where the second switch is any switch except the first switch on the selected forwarding path; and the data packet is forwarded according to the selected forwarding path. Because the first switch selects one forwarding path from the received forwarding paths, and sets the selected forwarding path on the second switch, it is ensured that the first switch and the second switch use the same forwarding path when forwarding the data packet. In this way, no loop is formed during data packet forwarding, thereby ensuring successful data packet sending.

Embodiment 2

This embodiment of the present disclosure provides a data packet sending method.

Figures 1, 2:
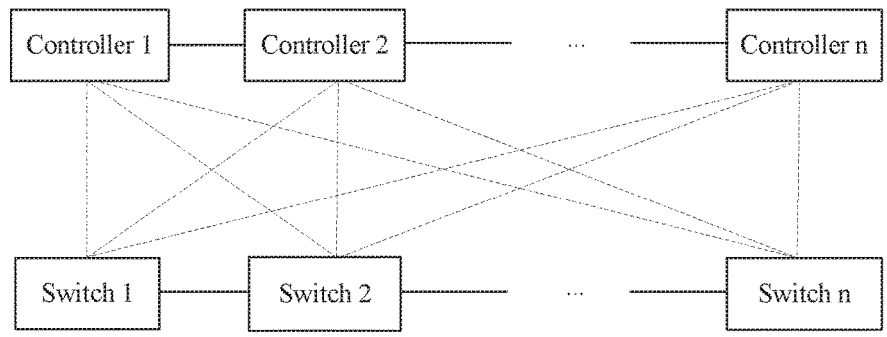
Figure 2:
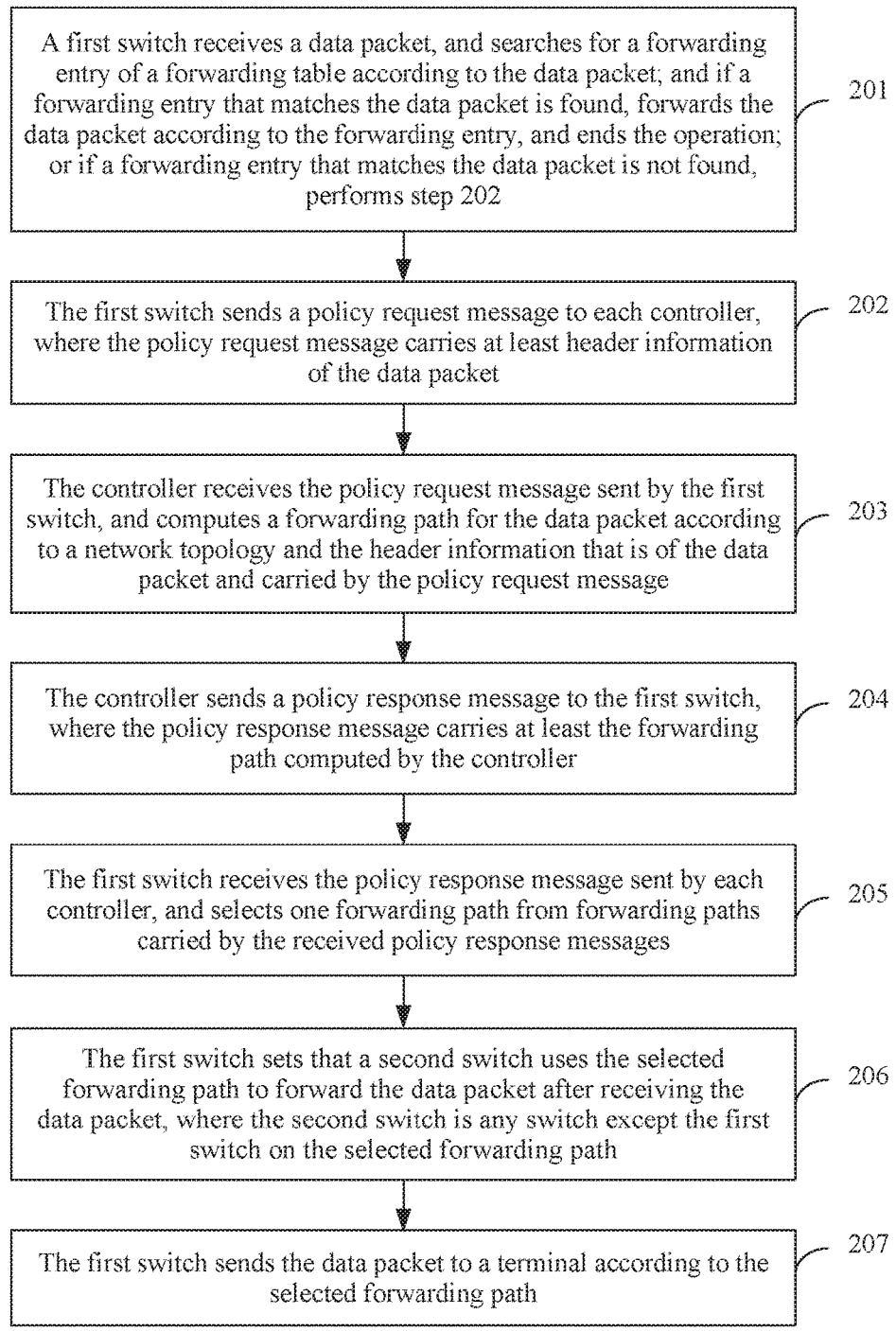

As shown in FIG. 2-1, an SDN network is constituted b, devices such as multiple controllers and multiple switches. When receiving a data packet, a switch searches for a forwarding entry of a forwarding table according to header information of the data packet. If a forwarding entry that matches the header information of the data packet is not found, the switch may send the data packet using the method provided in this embodiment of the present disclosure. For ease of description, in this embodiment of the present disclosure, the switch is referred to as a first switch.

Referring to FIG. 2-2, the method includes the following steps.

Step 201: The first switch receives a data packet, and searches for a forwarding entry of a forwarding table according to the data packet; and if a forwarding entry that matches the data packet is found, forwards the data packet according to the forwarding entry, and ends the operation; or if a forwarding entry that matches the data packet is not found, performs step 202.

The forwarding table includes at least one forwarding entry, and the forwarding entry includes at least header information of a data packet and an identifier of a device corresponding to a next hop. The device corresponding to the next hop may be a switch or a terminal.

This step is specifically as follows: The first switch receives a data packet, obtains header information of the data packet from the data packet, and searches for a forwarding entry of a stored forwarding table according to the header information of the data packet; and if a forwarding entry that includes the header information of the data packet is found, that is, a forwarding entry that matches the header information of the data packet is found, sends the data packet to a device corresponding to a next hop according to an identifier that is of the device corresponding to the next hop and included by the forwarding entry, and ends the operation; or if a forwarding entry that matches the header information of the data packet is not found, performs step 202.

The header information of the data packet includes address information required for sending the data packet, and the address information includes at least one or more of a source IP address, a destination IP address, a MAC address of a source device, a MAC address of a destination device, a VLAN identifier corresponding to the source device, and a VLAN identifier corresponding to the destination device that are required for sending the data packet.

For example, the first switch S1 receives a data packet P1, obtains header information T1 of the data packet from the data packet P1, and searches for a forwarding entry of a stored forwarding table according to the header information T1 of the data packet P1; and if a forwarding entry that matches the header information T1 of the data packet P1 is not found, performs step 202.

Step 202: The first switch sends a policy request message to each controller, where the policy request message carries at least header information of the data packet.

For example, it is assumed that the SDN network includes controllers C1 and C2. The first switch S1 separately sends the policy request message to the controllers C1 and C2, where the policy request message carries at least the header information T1 of the data packet P1.

After the first switch sends the policy request message to each controller by performing the foregoing step 202, any controller of controllers in the SDN network computes a forwarding path for the data packet according to operations of the following steps 203 and 204, and sends the computed forwarding path to the first switch.

Step 203: The controller receives the policy request message sent by the first switch, and computes a forwarding path for the data packet according to a network topology and the header information that is of the data packet and carried by the policy request message.

Specifically, the controller receives the policy request message sent by the first switch, and computes, according to the network topology stored on the controller and the header information that is of the data packet and carried by the policy request message, a forwarding path through which the data packet passes when the data packet is forwarded from the first switch to a terminal.

For example, the controller C1 receives the policy request message sent by the first switch S1, and computes, according to the network topology stored on the controller C1 and the header information T1 that is of the data packet P1 and carried by the policy request message, the forwarding path through which the data packet P1 passes when the data packet P1 is forwarded from the first switch S1 to the terminal. It is assumed that the computed forwarding path is S1-S2-S4, that is, the data packet P1 is forwarded from the first switch S1 to a switch S2, forwarded from the switch S2 to a switch S4, and finally forwarded from the switch S4 to the terminal.

Because of a real-time difference of network statuses, different controllers may have different network topologies, and forwarding paths computed by different controllers may be different. For example, in this embodiment of the present disclosure, a forwarding path computed by the controller C2 may be S1-S3-S4, which is different from the forwarding path S1-S2-S4 computed by the controller C1.

Step 204: The controller sends a policy response message to the first switch, where the policy response message carries at least the forwarding path computed by the controller.

For example, the controller C1 sends the policy response message to the first switch S1, where the policy response message carries at least the forwarding path S1-S2-S4 computed by the controller C1.

Like the controller, each of other controllers in the SDN network computes a forwarding path for the data packet according to the operations of the foregoing steps 203 and 204, and sends the computed forwarding path to the first switch.

Step 205: The first switch receives the policy response message sent by each controller, and selects one forwarding path from forwarding paths carried by the received policy response messages.

According to different selection methods, this step may be implemented in the following first, second, and third manners, which specifically include the following:

First, the first switch receives the policy response message sent by each controller, and randomly selects one forwarding path from the forwarding paths carried by the received policy response messages.

For example, the first switch S1 receives the policy response message sent by the controllers C1 and C2, the forwarding path carried by the policy response message sent by the controller C1 is S1-S2-S4, and the forwarding path carried by the policy response message sent by the controller C2 is S1-S3-S4. The first switch S1 randomly selects one forwarding path from the forwarding path S1-S2-S4 carried by the policy response message sent by the controller C1 and the forwarding path S1-S3-S4 carried by the policy response message sent by the controller C2. It is assumed that the selected forwarding path is S1-S2-S4.

Second, the first switch receives the policy response message sent by each controller, and selects, from the forwarding paths carried by the received policy response messages, a forwarding path sent by a controller having a shortest distance to the first switch.

The first switch may select, in the following two manners (1) and (2), the forwarding path sent by the controller having the shortest distance to the first switch, where the two manners (1) and (2) are specifically as follows:

(1) The policy response message sent by each controller further carries a distance between the controller and the first switch. The first switch selects, according to the distance carried by each policy response message, the forwarding path sent by the controller having the shortest distance to the first switch.

Each controller determines a distance between the controller and the first switch according to a network topology stored on the controller.

For example, the policy response message sent by each controller further carries a distance between the controller and the first switch. It is assumed that the policy response message sent by the controller C1 carries the forwarding path S1-S2-S4 and a distance 10, and the policy response message sent by the controller C2 carries the forwarding path S1-S3-S4 and a distance 15. The first switch selects, according to the distances 10 and 15 that are respectively carried by the policy response messages sent by controllers C1 and C2, the forwarding path S1-S2-S4 sent by the controller C1 having the shortest distance to the first switch S1.

(2) The first switch obtains a signal transmission distance between the first switch and each controller, and selects a forwarding path sent by a controller having a shortest signal transmission distance to the first switch.

The first switch sends distance test information to each controller. Each controller receives the distance test information sent by the first switch, and sends distance test response information to the first switch. The first switch receives the distance test response information sent by each controller, determines, according to a time of receiving the distance test response information, the controller having the shortest signal transmission distance to the first switch, and selects the forwarding path sent by the controller having the shortest signal transmission distance to the first switch.

A time that the first switch receives distance test response information sent by a controller is shorter, a signal transmission distance between the controller and the first switch is shorter.

For example, the first switch S1 sends the distance test information to the controllers C1 and C2. The controllers C1 and C2 receive the distance test information sent by the first switch S1, and separately send distance test response information to the first switch S. The first switch S1 receives the distance test response information sent by the controllers C1 and C2, determines, according to a time 2 s of receiving the distance test response information sent by the controller C1 and a time 5 s of receiving the distance test response information sent by the controller C2, that the controller having the shortest signal transmission distance to the first switch S1 is the controller C1, and selects the forwarding path S1-S2-S4 sent by the controller C1.

Third, the first switch receives the policy response message sent by each controller, and selects, from the forwarding paths carried by the received policy response messages, a forwarding path that is received first.

The first switch may select, in the following two manners (1) and (2), the forwarding path that is received first, and the manners are specifically as follows:

(1) The first switch selects, according to a correspondence among a stored identifier of a data packet, a response state, and a forwarding path, the forwarding path that is received first.

When receiving the policy response message that carries the forwarding path and the identifier of the data packet, the first switch determines, according to the correspondence among an identifier of a data packet, a response state, and a forwarding path, and the identifier that is of the data packet and carried by the policy response message, whether the forwarding path of the data packet is received for the first time. If the forwarding path of the data packet is received for the first time, the forwarding path carried by the policy response message is selected as the forwarding path that is received first. If the forwarding path of the data packet is not received for the first time, the forwarding path carried by the policy response message is discarded.

In step 202, the first switch further adds the identifier of the data packet to the policy request message, and stores the correspondence among an identifier of a data packet, a response state, and a forwarding path. In this case, both the response state and the forwarding path are null. The policy response message sent by each controller carries the identifier of the data packet in addition to the forwarding path. When receiving a policy response message sent by the controller, the first switch obtains a corresponding response state from the correspondence among an identifier of a data packet, a response state, and a forwarding path according to the identifier that is of the data packet and carried by the policy response message. If the obtained response state is null, it indicates that a forwarding path carried by the policy response message is the forwarding path that is received first. The forwarding path that is received first is stored in the correspondence among an identifier of a data packet, a response state, and a forwarding path, and the response state is changed to received.

If the obtained response state is received, it indicates that the policy response message is not the policy response message that is received first.

The identifier of the data packet may be obtained from the header information of the data packet, or the first switch may randomly generate a character string, and generate an identifier for the data packet according to the character string and an identifier of the first switch.

For example, in step 202, the first switch S further adds the identifier M of the data packet P1 to the policy request message, and stores a correspondence, among the identifier M of the data packet, a response state, and a forwarding path, shown in Table 1. In this case, both the response state and the forwarding path are null. Both the policy response messages sent by controllers C1 and C2 carry the identifier M of the data packet P1. When receiving the policy response message sent by the controller C1, the first switch S1 obtains a corresponding response state from the correspondence, among an identifier of a data packet, a response state, and a forwarding path, shown in Table 1 according to the identifier M that is of the data packet P1 and carried by the policy response message. If the obtained response state is null, it indicates that the forwarding path S1-S2-S4 carried by the policy response message is the forwarding path that is received first. The forwarding path that is received first S1-S2-S4 is stored in the correspondence, among an identifier of a data packet, a response state, and a forwarding path, shown in Table 2, and the response state is changed to received.

TABLE 1

| Identifier of a data packet | Response state | Forwarding path |
|---|---|---|
| M | Null | Null |
| ... | ... | ... |

TABLE 2

| Identifier of a data packet | Response state | Forwarding path |
|---|---|---|
| M | Received | S1-S2-S4 |
| ... | ... | ... |

When receiving the policy response message sent by the controller C2, the first switch S1 obtains a corresponding response state from the correspondence, among an identifier of a data packet, a response state, and a forwarding path, shown in Table 2 according to the identifier M that is of the data packet P1 and carried by the policy response message. If the obtained response state is received, it indicates that the forwarding path S1-S3-S4 carried by the policy response message is not the forwarding path that is received first.

(2) The first switch selects, according to a sequence number of each policy response message corresponding to the received data packet, the forwarding path that is received first.

In step 202, the first switch further adds an identifier of a data packet to the policy request message. The policy response message sent by each controller carries the identifier of the data packet in addition to the forwarding path. Each time the first switch receives a policy response message sent by a controller, the first switch determines, according to an identifier that is of a data packet and carried by the policy response message, whether the policy response message is a policy response message corresponding to the data packet. If the policy response message is a policy response message corresponding to the data packet, a sequence number is allocated to the policy response message. After receiving the policy response message that is corresponding to the data packet and sent by each controller, the first switch selects a policy response message of a smallest sequence number from policy response messages corresponding to the data packet, and determines a forwarding path carried by the selected policy response message as the forwarding path that is received first.

For example, in step 202, the first switch S1 further adds the identifier M of the data packet to the policy request message. The policy response message sent by each controller carries the identifier M of the data packet in addition to the forwarding path. The first switch S receives the policy response message sent by the controller C1, and determines, according to the identifier M that is of the data packet and carried by the policy response message, that the policy response message is a policy response message corresponding to the data packet. A sequence number 001 is allocated to the policy response message sent by the controller C1. The first switch S1 receives the policy response message sent by the controller C2, and determines, according to the identifier M that is of the data packet and carried by the policy response message, that the policy response message is a policy response message corresponding to the data packet. A sequence number 002 is allocated to the policy response message sent by the controller C2. The first switch selects the policy response message of the smallest sequence number from policy response messages corresponding to the data packet, that is, the policy response message sent by the controller C1 corresponding to the sequence number 001, and determines the forwarding path S1-S2-S4 carried by the policy response message sent by the controller C1 as the forwarding path that is received first.

Further, the first switch writes the selected forwarding path into the forwarding table, discards each unselected forwarding path to avoid that the unselected forwarding path occupies storage space, and sends a second notification message to each controller corresponding to each unselected forwarding path, where the second notification message carries a discard indication. The controller corresponding to each unselected forwarding path receives the second notification message sent by the first switch, and deletes, according to the discard indication carried by the second notification message, a forwarding path computed by the controller.

Because forwarding paths computed by different controllers may be different, after selecting one forwarding path according to the operation of the foregoing step 205, the first switch further needs to set, according to an operation of the following step 206, that another switch on the forwarding path uses the forwarding path to forward the data packet when receiving the data packet.

Step 206: The first switch sets that a second switch uses the selected forwarding path to forward the data packet after receiving the data packet, where the second switch is any switch except the first switch on the selected forwarding path.

This step may be implemented in the following first and second manners, which are specifically as follows:

First, the first switch sets the second switch using a controller corresponding to the selected forwarding path, which is specifically implemented by performing operations of the following steps (A-1) to (A-3), including:

(A-1): The first switch sends a first notification message to the controller corresponding to the selected forwarding path, where the first notification message carries a receive indication.

For example, the first switch S1 sends the first notification message to the controller C1 corresponding to the selected forwarding path S1-S2-S4, where the first notification message carries a receive indication R.

(A-2): The controller corresponding to the selected forwarding path receives the first notification message sent by the first switch, and sends the selected forwarding path to the second switch according to the receive indication carried by the first notification message.

For example, the controller C1 corresponding to the selected forwarding path S1-S2-S4 receives the first notification message sent by the first switch S1, and sends the selected forwarding path S1-S2-S4 to the second switches S2 and S4 according to the receive indication R carried by the first notification message.

(A-3): The second switch receives the forwarding path sent by the controller, and writes the forwarding path into the forwarding table.

For example, the second switches S2 and S4 separately receive the forwarding path S1-S2-S4 sent by the controller C1, and separately write the forwarding path S1-S2-S4 into the forwarding table.

Second, the first switch directly sets the second switch, which is implemented by performing operations of the following steps (B-1) and (B-2), including:

(B-1): The first switch sends the selected forwarding path to the second switch.

Specifically, the first switch determines an identifier of the second switch on the selected forwarding path according to the selected forwarding path, and sends the selected forwarding path to the second switch according to the determined identifier of the second switch.

For example, the first switch S1 determines, according to the selected forwarding path S1-S2-S4, that identifiers of the second switches on the selected forwarding path S1-S2-S4 are S2 and S4, and sends the selected forwarding path S1-S2-S4 to the second switches S2 and S4 according to the determined identifiers S2 and S4 of the second switches.

(B-2): The second switch receives the forwarding path sent by the first switch, and writes the forwarding path into the forwarding table.

For example, the second switches S2 and S4 separately receive the forwarding path S1-S2-S4 sent by the first switch S1, and separately write the forwarding path S1-S2-S4 into the forwarding table.

The first switch selects one forwarding path by performing the operations of the foregoing steps 205 and 206, and after setting the selected forwarding path on the second switch, may send the data packet to the terminal by performing an operation of the following step 207.

Step 207: The first switch sends the data packet to a terminal according to the selected forwarding path.

Specifically, the first switch finds, according to the header information of the data packet, a forwarding entry that matches the header information of the data packet from the forwarding table stored on the first switch, where the forwarding entry records an identifier of a device corresponding to a next hop of the first switch on the selected forwarding path. The first switch sends the data packet to the device corresponding to the next hop according to the forwarding entry. If the device is the second switch, the second switch finds, according to the header information of the data packet, a forwarding entry that matches the header information of the data packet from a forwarding table stored on the second switch, where the forwarding entry records an identifier of a device corresponding to a next hop of the second switch on the selected forwarding path. The second switch sends the data packet to the device corresponding to the next hop according to the forwarding entry. In this way, according to the selected forwarding path, the data packet is forwarded from the first switch to the second switch until the data packet is sent to the terminal.

For example, the first switch S1 finds, according to the header information T1 of the data packet P1, a forwarding entry that matches the header information T1 of the data packet P1 from the forwarding table stored on the first switch S1, where the forwarding entry records an identifier S2 of a device corresponding to a next hop of the first switch S1 on the selected forwarding path S1-S2-S4, that is, the second switch S2. The first switch S1 sends the data packet P1 to the second switch S2 according to the forwarding entry. The second switch S2 finds, according to the header information T1 of the data packet P1, a forwarding entry that matches the header information T1 of the data packet P1 from the forwarding table stored on the second switch S2, where the forwarding entry records an identifier S4 of a device corresponding to a next hop of the second switch S2 on the selected forwarding path S1-S2-S4, that is, the second switch S4. The second switch S2 sends the data packet P1 to the second switch S4 according to the forwarding entry. Finally, the second switch S4 sends the data packet P to the terminal according to the forwarding entry that matches the header information T1 of the data packet P1.

In this embodiment of the present disclosure, when a forwarding table of a first switch does not have a forwarding entry that matches header information of a data packet, a policy request message that carries the header information of the data packet is sent to each controller, so that each controller computes a forwarding path for the data packet, where the header information includes address information required for sending the data packet; a policy response message sent by each controller is received, where the policy response message includes the forwarding path; one forwarding path is selected from the received forwarding paths; it is set that a second switch uses the selected forwarding path to forward the data packet after receiving the data packet, where the second switch is any switch except the first switch on the selected forwarding path; and the data packet is forwarded according to the selected forwarding path. Because the first switch selects one forwarding path from the received forwarding paths, and sets the selected forwarding path on the second switch, it is ensured that the first switch and the second switch use the same forwarding path when forwarding the data packet. In this way, no loop is formed during data packet forwarding, thereby ensuring successful data packet sending.

Embodiment 3

This embodiment of the present disclosure provides a data packet sending method.

As shown in FIG. 2-1, an SDN network is constituted by devices such as multiple controllers and multiple switches. When receiving a data packet, a switch searches for a forwarding entry of a forwarding table according to header information of the data packet. If a forwarding entry that matches the header information of the data packet is not found, the switch may send the data packet using the method provided in this embodiment of the present disclosure. For ease of description, in this embodiment of the present disclosure, the switch is referred to as a first switch.

Figure 3:
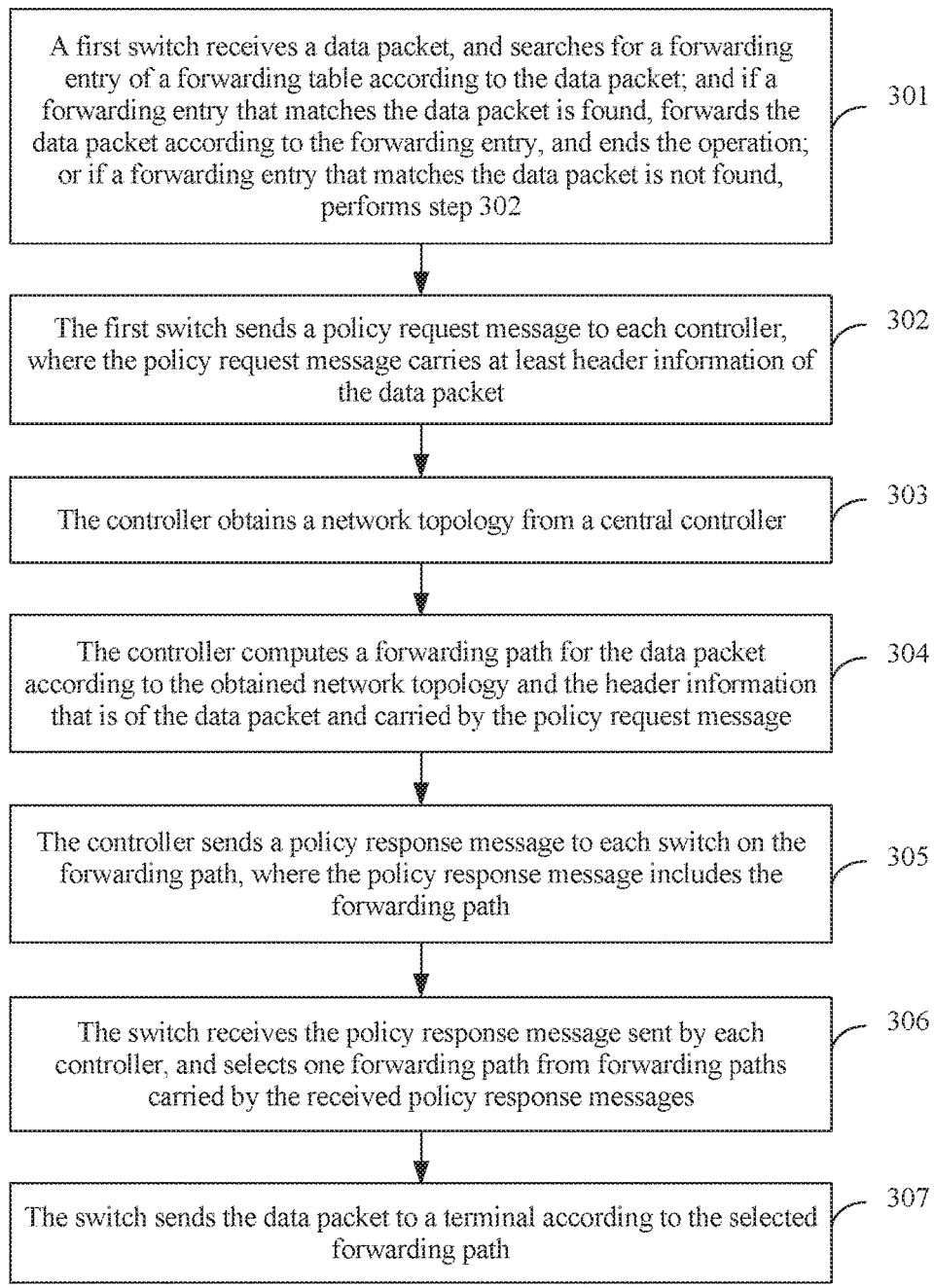
FIG. 3 is a flowchart of a data packet sending method according to Embodiment 3 of the present disclosure.

Referring to FIG. 3, the method includes the following steps.

Steps 301 and 302 whose operations are the same as the operations of steps 201 and 202 are not repeatedly described herein.

After the first switch sends the policy request message to each controller by performing the foregoing step 302, any controller of controllers in the SDN network computes a forwarding path for the data packet according to operations of the following steps 303 to 305, and sends the computed forwarding path to each switch on the forwarding path.

Step 303: The controller obtains a network topology from a central controller.

The central controller may be any controller in the SDN network. The central controller obtains the network topology of the SDN network. Each of other controllers except the central controller in the SDN network obtains the same network topology from the central controller.

For example, both controllers C1 and C2 obtain the same network topology from a central controller C.

Step 304: The controller computes a forwarding path for the data packet according to the obtained network topology and the header information that is of the data packet and carried by the policy request message.

Specifically, the controller computes, according to the obtained network topology and the header information that is of the data packet and carried by the policy request message, a forwarding path through which the data packet passes when the data packet is forwarded from the first switch to a terminal.

For example, the controller C1 computes, according to the obtained network topology and header information T1 that is of a data packet P1 and carried by the policy request message, a forwarding path through which the data packet P1 passes when the data packet P1 is forwarded from the first switch S1 to the terminal. It is assumed that the computed forwarding path is S1-S2-S4, that is, the data packet P1 is forwarded from the first switch S1 to a switch S2, forwarded from the switch S2 to a switch S4, and finally forwarded from the switch S4 to the terminal.

Because controllers obtain the same network topology from the central controller, forwarding paths computed by the controllers according to the same network topology and the header information of the data packet are the same.

Step 305: The controller sends a policy response message to each switch on the forwarding path, where the policy response message includes the forwarding path.

Switches on the forwarding path include the first switch.

This step is specifically as follows: The controller determines an identifier of each switch on the forwarding path according to the computed forwarding path, and sends the policy response message to each switch on the forwarding path according to the determined identifier of the switch, where the policy response message includes the forwarding path.

For example, the controller C1 determines, according to the computed forwarding path S1-S2-S4, that identifiers of switches on the forwarding path S1-S2-S4 are S1, S2, and S4, and sends the policy response message to the switches S1, S2, and S4 on the forwarding path S1-S2-S4 according to the determined identifiers S1. S2, and S4 of the switches, where the policy response message includes the forwarding path S1-S2-S4.

Like the controller, each of other controllers in the SDN network computes a forwarding path for the data packet according to the operations of the foregoing steps 303 to 305, and sends the computed forwarding path to each switch on the forwarding path.

After each controller sends the computed forwarding path to each switch on the forwarding path by performing the operation of the foregoing step 305, any switch of switches on the forwarding path forwards the data packet according to the forwarding path and operations of the following steps 306 and 307.

Step 306: The switch receives the policy response message sent by each controller, and selects one forwarding path from forwarding paths carried by the received policy response messages.

Specifically, the switch receives the policy response message sent by each controller, and randomly selects one forwarding path from the forwarding paths included by the received policy response messages.

For example, the switch S1 receives the policy response messages sent by the controllers C1 and C2, where both forwarding paths included by the policy response messages that are sent by the controllers C1 and C2 are S1-S2-S4. The switch S1 randomly selects one forwarding path S1-S2-S4 from the forwarding paths S1-S2-S4 sent by the controllers C1 and C2.

Further, the switch writes the selected forwarding path into the forwarding table, and discards each unselected forwarding path to avoid that the unselected forwarding path occupies storage space.

Like the switch, each of other switches on the forwarding path randomly selects one forwarding path from the received forwarding paths according to the foregoing method.

Step 307: The switch sends the data packet to a terminal according to the selected forwarding path.

Specifically, the first switch finds, according to the header information of the data packet, a forwarding entry that matches the header information of the data packet from a forwarding table stored on the first switch, where the forwarding entry records an identifier of a device corresponding to a next hop of the first switch on the forwarding path. The first switch sends the data packet to the device corresponding to the next hop according to the forwarding entry. If the device is a switch, the switch finds, according to the header information of the data packet, a forwarding entry that matches the header information of the data packet from a forwarding table stored on the switch, where the forwarding entry records an identifier of a device corresponding to a next hop of the switch on the selected forwarding path. The switch sends the data packet to the device corresponding to the next hop according to the forwarding entry. In this way, according to the selected forwarding path, the data packet is forwarded from the first switch to another switch until the data packet is sent to the terminal.

For example, the first switch S1 finds, according to the header information T1 of the data packet P1, a forwarding entry that matches the header information T1 of the data packet P from the forwarding table stored on the first switch S1, where the forwarding entry records an identifier S2 of a device corresponding to a next hop of the first switch S1 on the selected forwarding path S1-S2-S4, that is, the switch S2. The first switch S1 sends the data packet P1 to the switch S2 according to the forwarding entry. The switch S2 finds, according to the header information T1 of the data packet P1, a forwarding entry that matches the header information T1 of the data packet P1 from a forwarding table stored on the switch S2, where the forwarding entry records an identifier S4 of a device corresponding to a next hop of the switch S2 in the selected forwarding path S1-S2-S4, that is, the switch S4. The switch S2 sends the data packet P1 to the switch S4 according to the forwarding entry. Finally, the switch S4 sends the data packet P1 to the terminal according to the forwarding entry that matches the header information T1 of the data packet P1.

In this embodiment of the present disclosure, a policy request message sent by a first switch is received, where the policy request message includes header information of a data packet, and the header information includes address information required for sending the data packet; a network topology is obtained from a central controller, and a forwarding path is computed for the data packet according to the obtained network topology and the header information of the data packet; and a policy response message is sent to each switch on the computed forwarding path, so that each switch on the forwarding path forwards the data packet according to the forwarding path. Because the same network topology is obtained from the central controller, forwarding paths computed by controllers are the same. Each switch on the forwarding path forwards the data packet according to the forwarding path. In this way, no loop is formed during data packet forwarding, thereby ensuring successful data packet sending.

Embodiment 4

Figure 4:
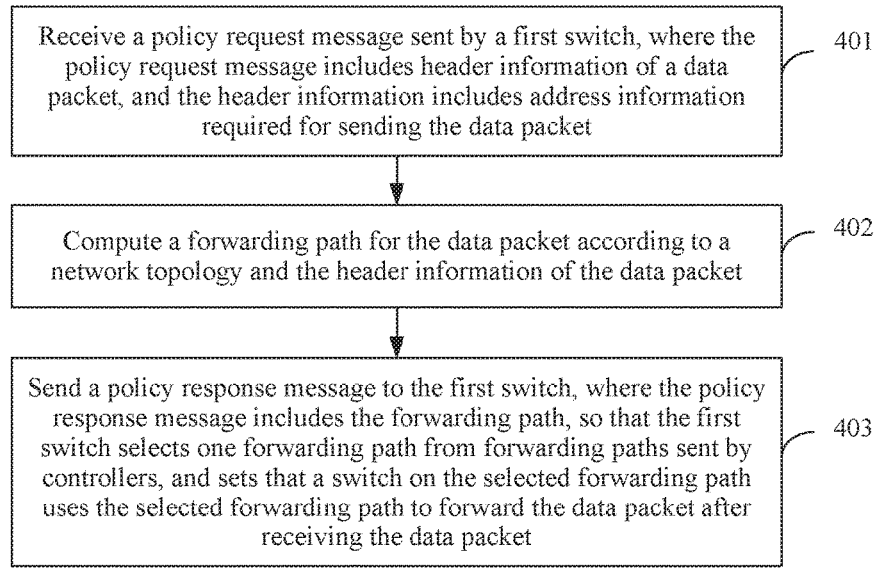
FIG. 4 is a flowchart of a data packet sending method according to Embodiment 4 of the present disclosure.

Referring to FIG. 4, this embodiment of the present disclosure provides a data packet sending method, including:

Step 401: Receive a policy request message sent by a first switch, where the policy request message includes header information of a data packet, and the header information includes address information required for sending the data packet.

Step 402: Compute a forwarding path for the data packet according to a network topology and the header information of the data packet.

Step 403: Send a policy response message to the first switch, where the policy response message includes the forwarding path, so that the first switch selects one forwarding path from forwarding paths sent by controllers, and sets that a switch on the selected forwarding path uses the selected forwarding path to forward the data packet after receiving the data packet.

Further, after the sending a policy response message to the first switch, the method further includes:

receiving a first notification message sent by the first switch, where the first notification message carries a receive indication; and sending the forwarding path to a second switch according to the receive indication, so that the second switch uses the forwarding path to forward the data packet after receiving the data packet, where the second switch is any switch except the first switch on the forwarding path.

Further, after the sending a policy response message to the first switch, the method further includes:

receiving a second notification message that is sent by the first switch when selecting another forwarding path except the forwarding path, where the second notification message carries a discard indication; and deleting the forwarding path according to the discard indication.

The policy response message carries an identifier of the data packet, the identifier of the data packet is used by the first switch to determine whether the forwarding path is a first received forwarding path of the data packet, and the first received forwarding path of the data packet is used as the selected forwarding path.

In this embodiment of the present disclosure, a policy request message sent by a first switch is received, where the policy request message includes header information of a data packet, and the header information includes address information required for sending the data packet; a forwarding path is computed for the data packet according to a network topology and the header information of the data packet; and a policy response message is sent to the first switch, where the policy response message includes the forwarding path, so that the first switch selects one forwarding path from forwarding paths sent by controllers, and sets that a switch on the selected forwarding path uses the selected forwarding path to forward the data packet after receiving the data packet. The forwarding path is sent to the first switch, so that the first switch selects one forwarding path and sets that a switch on the selected forwarding path uses the selected forwarding path to forward the data packet after receiving the data packet. In this way, forwarding paths used by switches are the same during data packet forwarding. Therefore, no loop is formed, thereby ensuring successful data packet sending.

Embodiment 5

Figure 5:
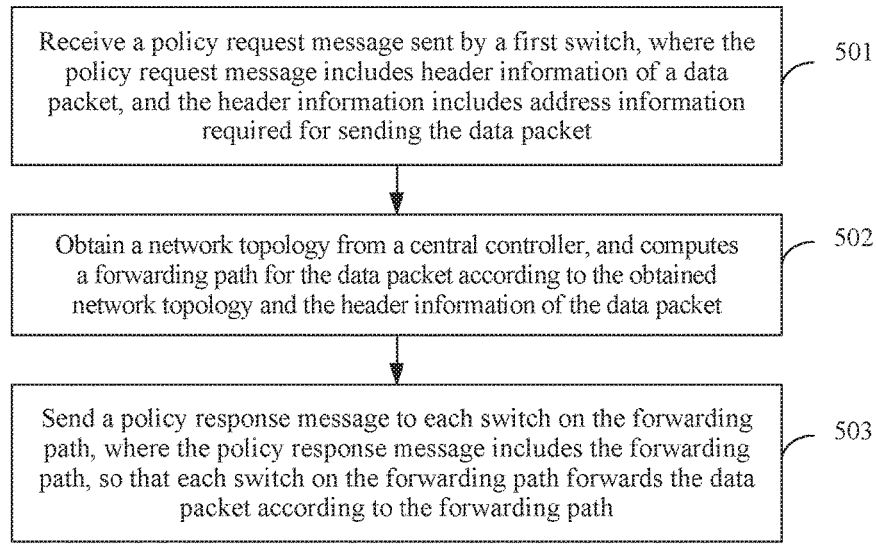
FIG. 5 is a flowchart of a data packet sending method according to Embodiment 5 of the present disclosure.

Referring to FIG. 5, this embodiment of the present disclosure provides a data packet sending method, including:

Step 501: Receive a policy request message sent by a first switch, where the policy request message includes header information of a data packet, and the header information includes address information required for sending the data packet.

Step 502: Obtain a network topology from a central controller, and compute a forwarding path for the data packet according to the obtained network topology and the header information of the data packet.

Step 503: Send a policy response message to each switch on the forwarding path, where the policy response message includes the forwarding path, so that each switch on the forwarding path forwards the data packet according to the forwarding path.

In this embodiment of the present disclosure, a policy request message sent by a first switch is received, where the policy request message includes header information of a data packet, and the header information includes address information required for sending the data packet; a network topology is obtained from a central controller, and a forwarding path is computed for the data packet according to the obtained network topology and the header information of the data packet; and a policy response message is sent to each switch on the forwarding path, where the policy response message includes the forwarding path, so that each switch on the forwarding path forwards the data packet according to the forwarding path. Because the same network topology is obtained from the central controller, forwarding paths computed by controllers are the same. Each switch on the forwarding path forwards the data packet according to the forwarding path. In this way, no loop is formed during data packet forwarding, thereby ensuring successful data packet sending.

Embodiment 6

Figure 6:
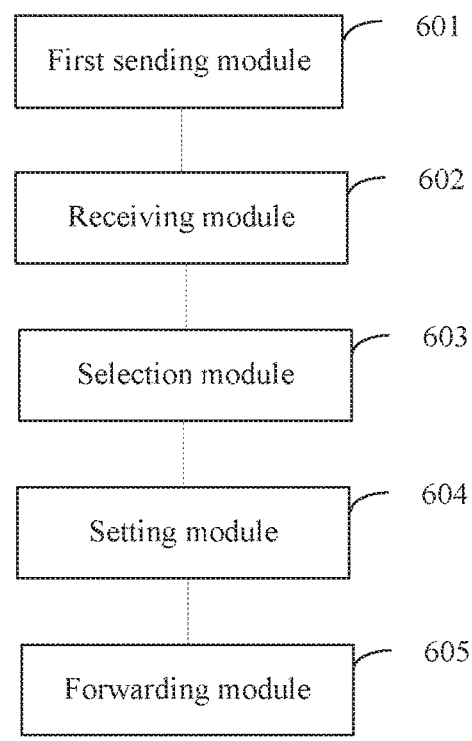
FIG. 6 is a schematic structural diagram of a data packet sending apparatus according to Embodiment 6 of the present disclosure.

Referring to FIG. 6, this embodiment of the present disclosure provides a data packet sending apparatus, including:

a first sending module 601, configured to: when a forwarding table of a first switch does not have a forwarding entry that matches header information of a data packet, send, to each controller, a policy request message that carries the header information of the data packet, so that each controller computes a forwarding path for the data packet, where the header information includes address information required for sending the data packet;

a receiving module 602, configured to receive a policy response message sent by each controller, where the policy response message includes the forwarding path;

a selection module 603, configured to select one forwarding path from the received forwarding paths;

a setting module 604, configured to set that a second switch uses the selected forwarding path to forward the data packet after receiving the data packet, where the second switch is any switch except the first switch on the selected forwarding path; and a forwarding module 605, configured to forward the data packet according to the selected forwarding path.

The selection module 603 includes:

a first selection unit, configured to randomly select one forwarding path from the received forwarding paths; or a second selection unit, configured to select, from the received forwarding paths, a forwarding path sent by a controller having a shortest distance to the first switch; or a third selection unit, configured to select, from the received forwarding paths, a forwarding path that is received first.

The third selection unit includes:

a determining subunit, configured to determine, according to an identifier that is of the data packet and carried by the policy response message, whether the forwarding path of the data packet is received for the first time; and a selection subunit, configured to: if the forwarding path of the data packet is received for the first time, select the forwarding path carried by the policy response message as the forwarding path that is received first.

The policy request message carries the identifier of the data packet.

The setting module 604 includes:

a first sending unit, configured to send a first notification message to a controller corresponding to the selected forwarding path, where the first notification message carries a receive indication, so that the controller corresponding to the selected forwarding path sends the selected forwarding path to the second switch according to the receive indication, and the second switch uses the selected forwarding path to forward the data packet after receiving the data packet.

The setting module 604 includes:

a second sending unit, configured to send the selected forwarding path to the second switch, so that the second switch uses the selected forwarding path to forward the data packet after receiving the data packet.

Further, the apparatus further includes:

a second sending module, configured to send a second notification message to a controller corresponding to each unselected forwarding path, where the second notification message carries a discard indication, and the discard indication indicates that a forwarding path sent by the controller corresponding to each unselected forwarding path is not selected.

In this embodiment of the present disclosure, when a forwarding table of a first switch does not have a forwarding entry that matches header information of a data packet, a policy request message that carries the header information of the data packet is sent to each controller, so that each controller computes a forwarding path for the data packet, where the header information includes address information required for sending the data packet; a policy response message sent by each controller is received, where the policy response message includes the forwarding path; one forwarding path is selected from the received forwarding paths; it is set that a second switch uses the selected forwarding path to forward the data packet after receiving the data packet, where the second switch is any switch except the first switch on the selected forwarding path; and the data packet is forwarded according to the selected forwarding path. Because the first switch selects one forwarding path from the received forwarding paths, and sets the selected forwarding path on the second switch, it is ensured that the first switch and the second switch use the same forwarding path when forwarding the data packet. In this way, no loop is formed during data packet forwarding, thereby ensuring successful data packet sending.

Embodiment 7

Figure 7:
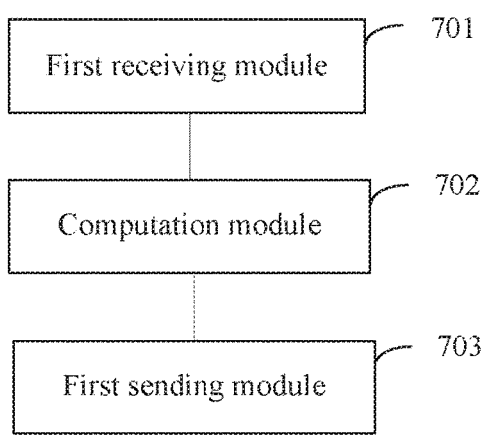
FIG. 7 is a schematic structural diagram of a data packet sending apparatus according to Embodiment 7 of the present disclosure.

Referring to FIG. 7, this embodiment of the present disclosure provides a data packet sending apparatus, including:

a first receiving module 701, configured to receive a policy request message sent by a first switch, where the policy request message includes header information of a data packet, and the header information includes address information required for sending the data packet;

a computation module 702, configured to compute a forwarding path for the data packet according to a network topology and the header information of the data packet; and a first sending module 703, configured to send a policy response message to the first switch, where the policy response message includes the forwarding path, so that the first switch selects one forwarding path from forwarding paths sent by controllers, and sets that a switch on the selected forwarding path uses the selected forwarding path to forward the data packet after receiving the data packet.

Further, the apparatus further includes:

a second receiving module, configured to receive a first notification message sent by the first switch, where the first notification message carries a receive indication; and a second sending module, configured to send the forwarding path to a second switch according to the receive indication, so that the second switch uses the forwarding path to forward the data packet after receiving the data packet, where the second switch is any switch except the first switch on the forwarding path.

Further, the apparatus further includes:

a third receiving module, configured to receive a second notification message that is sent by the first switch when selecting another forwarding path except the forwarding path, where the second notification message carries a discard indication; and a deletion module, configured to delete the forwarding path according to the discard indication.

The policy response message carries an identifier of the data packet, the identifier of the data packet is used by the first switch to determine whether the forwarding path is a first received forwarding path of the data packet, and the first received forwarding path of the data packet is used as the selected forwarding path.

In this embodiment of the present disclosure, a policy request message sent by a first switch is received, where the policy request message includes header information of a data packet, and the header information includes address information required for sending the data packet; a forwarding path is computed for the data packet according to a network topology and the header information of the data packet; and a policy response message is sent to the first switch, where the policy response message includes the forwarding path, so that the first switch selects one forwarding path from forwarding paths sent by controllers, and sets that a switch on the selected forwarding path uses the selected forwarding path to forward the data packet after receiving the data packet. The forwarding path is sent to the first switch, so that the first switch selects one forwarding path and sets that a switch on the selected forwarding path uses the selected forwarding path to forward the data packet after receiving the data packet. In this way, forwarding paths used by switches are the same during data packet forwarding. Therefore, no loop is formed, thereby ensuring successful data packet sending.

Embodiment 8

Figure 8:
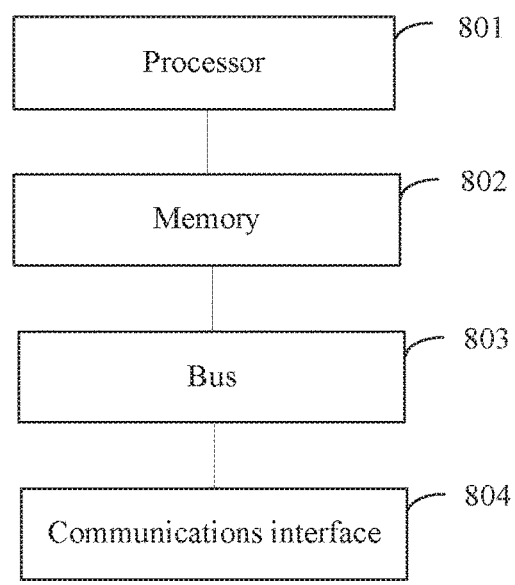
FIG. 8 is a schematic structural diagram of a data packet sending apparatus according to Embodiment 8 of the present disclosure.

Referring to FIG. 8, this embodiment of the present disclosure provides a data packet sending apparatus, where the apparatus includes a processor 801, a memory 802, a bus 803, and a communications interface 804. The memory 802 is configured to store a computer execution instruction; the processor 801 is connected to the memory 802 using the bus 803; when the data packet sending apparatus runs, the processor 801 executes the computer execution instruction stored by the memory 802, so that the data packet sending apparatus executes the following data packet sending method, including:

when a forwarding table of a first switch does not have a forwarding entry that matches header information of a data packet, sending, to each controller, a policy request message that carries the header information of the data packet, so that each controller computes a forwarding path for the data packet, where the header information includes address information required for sending the data packet;

receiving a policy response message sent by each controller, where the policy response message includes the forwarding path;

selecting one forwarding path from the received forwarding paths;

setting that a second switch uses the selected forwarding path to forward the data packet after receiving the data packet, where the second switch is any switch except the first switch on the selected forwarding path; and forwarding the data packet according to the selected forwarding path.

Preferably, the selecting one forwarding path from the received forwarding paths includes:

randomly selecting one forwarding path from the received forwarding paths; or selecting, from the received forwarding paths, a forwarding path sent by a controller having a shortest distance to the first switch; or selecting, from the received forwarding paths, a forwarding path that is received first.

Preferably, the selecting, from the received forwarding paths, a forwarding path that is received first includes:

determining, according to an identifier that is of the data packet and carried by the policy response message, whether the forwarding path of the data packet is received for the first time; and if the forwarding path of the data packet is received for the first time, selecting the forwarding path carried by the policy response message as the forwarding path that is received first.

Preferably, the policy request message carries the identifier of the data packet.

Preferably, the setting that a second switch uses the selected forwarding path to forward the data packet after receiving the data packet includes:

sending a first notification message to a controller corresponding to the selected forwarding path, where the first notification message carries a receive indication, so that the controller corresponding to the selected forwarding path sends the selected forwarding path to the second switch according to the receive indication, and the second switch uses the selected forwarding path to forward the data packet after receiving the data packet.

Preferably, the setting that a second switch uses the selected forwarding path to forward the data packet after receiving the data packet includes:

sending the selected forwarding path to the second switch, so that the second switch uses the selected forwarding path to forward the data packet after receiving the data packet.

Further, after the selecting one forwarding path from the received forwarding paths, the method further includes:

sending a second notification message to a controller corresponding to each unselected forwarding path, where the second notification message carries a discard indication, and the discard indication indicates that a forwarding path sent by the controller corresponding to each unselected forwarding path is not selected.

In this embodiment of the present disclosure, when a forwarding table of a first switch does not have a forwarding entry that matches header information of a data packet, a policy request message that carries the header information of the data packet is sent to each controller, so that each controller computes a forwarding path for the data packet, where the header information includes address information required for sending the data packet; a policy response message sent by each controller is received, where the policy response message includes the forwarding path; one forwarding path is selected from the received forwarding paths; it is set that a second switch uses the selected forwarding path to forward the data packet after receiving the data packet, where the second switch is any switch except the first switch on the selected forwarding path; and the data packet is forwarded according to the selected forwarding path. Because the first switch selects one forwarding path from the received forwarding paths, and sets the selected forwarding path on the second switch, it is ensured that the first switch and the second switch use the same forwarding path when forwarding the data packet. In this way, no loop is formed during data packet forwarding, thereby ensuring successful data packet sending.

Embodiment 9

Figure 9:
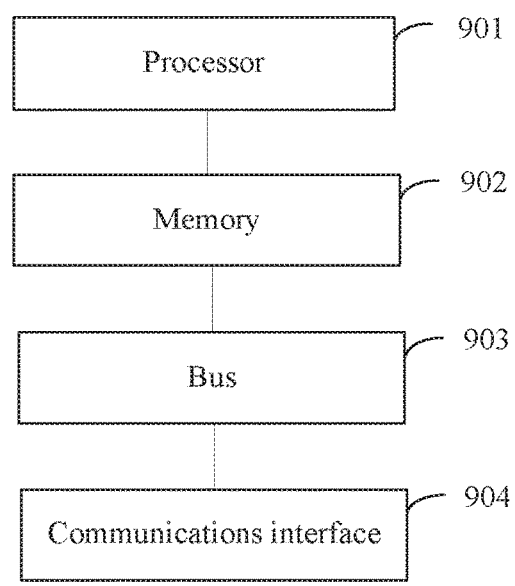
FIG. 9 is a schematic structural diagram of a data packet sending apparatus according to Embodiment 9 of the present disclosure.

Referring to FIG. 9, this embodiment of the present disclosure provides a data packet sending apparatus, where the apparatus includes a processor 901, a memory 902, a bus 903, and a communications interface 904. The memory 902 is configured to store a computer execution instruction; the processor 901 is connected to the memory 902 using the bus 903; when the data packet sending apparatus runs, the processor 901 executes the computer execution instruction stored by the memory 902, so that the data packet sending apparatus executes the following data packet sending method, including:

receiving a policy request message sent by a first switch, where the policy request message includes header information of a data packet, and the header information includes address information required for sending the data packet:

computing a forwarding path for the data packet according to a network topology and the header information of the data packet; and sending a policy response message to the first switch, where the policy response message includes the forwarding path, so that the first switch selects one forwarding path from forwarding paths sent by controllers, and sets that a switch on the selected forwarding path uses the selected forwarding path to forward the data packet after receiving the data packet.

Further, after the sending a policy response message to the first switch, the method further includes:

receiving a first notification message sent by the first switch, where the first notification message carries a receive indication; and sending the forwarding path to a second switch according to the receive indication, so that the second switch uses the forwarding path to forward the data packet after receiving the data packet, where the second switch is any switch except the first switch on the forwarding path.

Further, after the sending a policy response message to the first switch, the method further includes:

receiving a second notification message that is sent by the first switch when selecting another forwarding path except the forwarding path, where the second notification message carries a discard indication; and deleting the forwarding path according to the discard indication.

The policy response message carries an identifier of the data packet, the identifier of the data packet is used by the first switch to determine whether the forwarding path is a first received forwarding path of the data packet, and the first received forwarding path of the data packet is used as the selected forwarding path.

In this embodiment of the present disclosure, a policy request message sent by a first switch is received, where the policy request message includes header information of a data packet, and the header information includes address information required for sending the data packet; a forwarding path is computed for the data packet according to a network topology and the header information of the data packet; and a policy response message is sent to the first switch, where the policy response message includes the forwarding path, so that the first switch selects one forwarding path from forwarding paths sent by controllers, and sets that a switch on the selected forwarding path uses the selected forwarding path to forward the data packet after receiving the data packet. The forwarding path is sent to the first switch, so that the first switch selects one forwarding path and sets that a switch on the selected forwarding path uses the selected forwarding path to forward the data packet after receiving the data packet. In this way, forwarding paths used by switches are the same during data packet forwarding. Therefore, no loop is formed, thereby ensuring successful data packet sending.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A method for sending data packet in a network that comprises at least two controllers and multiple switches, wherein the method comprises:
    sending, by a first switch to the controllers, a policy request message that carries header information of a data packet when a forwarding table of the first switch does not have a forwarding entry that matches the header information of the data packet;
    receiving, by the first switch, policy response messages sent by the controllers that include respective controller-determined forwarding paths determined by the controllers;
    selecting, by the first switch, a forwarding path from the received controller-determined forwarding paths;
    informing a second switch of the selected forwarding path, wherein the second switch is a switch besides the first switch on the selected forwarding path; and
    forwarding, by the first switch, the data packet according to the selected forwarding path.

2. The method according to claim 1, wherein the selecting, by the first switch, the forwarding path from the controller-determined forwarding paths comprises:
    selecting, from the received controller-determined forwarding paths, a controller-determined forwarding path sent by a controller having a shortest distance to the first switch.

3. The method according to claim 1, wherein the selecting, by the first switch, the forwarding path from the received controller-determined forwarding paths comprises:
    selecting, from the received controller-determined forwarding paths, a controller-determined forwarding path that is received first in time.

4. The method according to claim 3, wherein the selecting, by the first switch, the forwarding path from the received controller-determined forwarding paths comprises:
    determining, according to an identifier of the data packet that is carried by a particular policy response message, whether a particular controller-determined forwarding path included in the particular policy response message for the data packet is a first received forwarding path for the data packet.

5. The method according to claim 1, wherein the informing the second switch of the selected forwarding path comprises:
    sending, by the first switch, a first notification message to a controller corresponding to the selected forwarding path, wherein the first notification message is used to inform the controller to send the selected forwarding path to the second switch.

6. The method according to claim 1, wherein the informing the second switch of the selected forwarding path comprises:
    sending, by the first switch, information of the selected forwarding path to the second switch, such that the second switch uses the selected forwarding path to forward the data packet after receiving the data packet.

7. The method according to claim 1, further comprising:
    sending, by the first switch, a second notification message to a controller corresponding to an unselected forwarding path, wherein the second notification message is used to indicate that a controller-determined forwarding path sent by the controller is not selected.

8. A method for sending data packet in a network that comprises a controller and multiple switches, wherein the method comprises:
    receiving, by the controller, a policy request message sent by a first switch, wherein the policy request message comprises header information of a data packet;
    computing, by the controller, a forwarding path for the data packet according to a network topology and the header information of the data packet;
    sending, by the controller, a policy response message to the first switch, wherein the policy response message comprises the forwarding path;
    receiving, by the controller, a first notification message sent by the first switch, wherein the first notification message informs the controller to send the forwarding path to a second switch, wherein the second switch is a switch besides the first switch on the forwarding path; and
    sending, by the controller in response to the first notification message, the forwarding path to the second switch, such that the second switch uses the forwarding path to forward the data packet after receiving the data packet.

9. A switch in a network that comprises at least two controllers and multiple switches, wherein the switch comprises:
    a memory configured to store instructions; and
    a processor coupled to the memory and configured to execute the instructions to:
        send a policy request message that carries header information of a data packet to the controllers when a forwarding table of the switch does not have a forwarding entry that matches the header information of the data packet;
        receive policy response messages sent by the controllers that include respective controller-determined forwarding paths determined by the controllers;
        select a forwarding path from the received controller-determined forwarding paths;
        inform a second switch of the selected forwarding path, wherein the second switch is another switch besides the switch on the selected forwarding path; and
        forward the data packet according to the selected forwarding path.

10. The switch according to claim 9, wherein the processor is configured to:
    select a controller-determined forwarding path sent by a controller having a shortest distance to the switch from the received controller-determined forwarding paths.

11. The switch according to claim 9, wherein the processor is configured to:
    select a controller-determined forwarding path that is received first in time.

12. The switch according to claim 11, wherein the processor is configured to:
    determine whether a particular controller-determined forwarding path included in a particular policy response message for the data packet is a first received forwarding path for the data packet according to an identifier of the data packet that is carried by the particular policy response message.

13. The switch according to claim 9, wherein the processor is configured to:
   send a first notification message to a controller corresponding to the selected forwarding path, wherein the first notification message is used to inform the controller corresponding to the selected forwarding path to send the selected forwarding path to the second switch.

14. The switch according to claim 9, wherein the processor is configured to:
   send information of the selected forwarding path to the second switch, such that the second switch uses the selected forwarding path to forward the data packet after receiving the data packet.

15. The switch according to claim 9, wherein the processor is further configured to:
   send a second notification message to a controller corresponding to an unselected forwarding path, wherein the second notification message is used to indicate that a controller-determined forwarding path sent by the controller is not selected.

16. A controller in a network that comprises at least two the controller and multiple switches, wherein the controller comprises:
   a memory configured to store instructions; and
   a processor coupled to the memory and configured to execute the instructions to:
      receive a policy request message sent by a first switch, wherein the policy request message comprises header information of a data packet;
      compute a forwarding path for the data packet according to a network topology and the header information of the data packet;
      send a policy response message to the first switch, wherein the policy response message comprises the forwarding path;
      receive a first notification message sent by the first switch, wherein the first notification message is used to inform the controller to send the forwarding path to a second switch, wherein the second switch is a switch besides the first switch on the forwarding path; and
      send the forwarding path to the second switch in response to the first notification message, such that the second switch uses the forwarding path to forward the data packet after receiving the data packet.

17. A system comprising a plurality of switches and controllers, wherein:
   a first switch is configured to send a policy request message that carries header information of a data packet to the controllers when a forwarding table of the switch does not have a forwarding entry that matches the header information of the data packet;
   each of the controllers is configured to compute a respective controller-determined forwarding path for the data packet according to a network topology and the header information of the data packet, and send a respective policy response message to the first switch, wherein the respective policy response message comprises the respective controller-determined forwarding path; and
   the first switch is further configured to select a forwarding path from received controller-determined forwarding paths sent by the controllers, inform a second switch of the selected forwarding path, and forward the data packet according to the selected forwarding path, wherein the second switch is a switch besides the first switch on the selected forwarding path.

18. The system according to claim 17, wherein the first switch is configured to send a first notification message to a controller corresponding to the selected forwarding path, wherein the first notification message is used to inform the controller to send the selected forwarding path to the second switch, such that the second switch uses the selected forwarding path to forward the data packet after receiving the data packet.

19. The system according to claim 17, wherein the first switch is configured to:
   send the selected forwarding path to the second switch, such that the second switch uses the selected forwarding path to forward the data packet after receiving the data packet.

20. The system according to claim 17, wherein the first switch is further configured to send a second notification message to a controller corresponding to an unselected forwarding path, wherein the second notification message is used to indicate that a controller-determined forwarding path sent by the controller is not selected.

* * * * *

UNITED STATES PATENT AND TRADEMARK OFFICE
CERTIFICATE OF CORRECTION

PATENT NO. : 10,171,355 B2
APPLICATION NO. : 15/376206
DATED : January 1, 2019
INVENTOR(S) : Jiao Wang et al.

It is certified that error appears in the above-identified patent and that said Letters Patent is hereby corrected as shown below:

In the Specification

In Column 4, Line 13 (approx.), delete "packet:" and insert -- packet; --;

In Column 6, Line 40, delete "disclosure:" and insert -- disclosure; --;

In Column 6, Line 46, delete "disclosure:" and insert -- disclosure; --;

In Column 6, Line 48, delete "disclosure:" and insert -- disclosure; --;

In Column 6, Line 56, delete "disclosure:" and insert -- disclosure; --;

In Column 11, Line 21, delete "S." and insert -- S1. --;

In Column 12, Line 14 (approx.), delete "S" and insert -- S1 --;

In Column 13, Line 20, delete "S" and insert -- S1 --;

In Column 15, Line 30 (approx.), delete "P" and insert -- P1 --;

In Column 17, Line 58, delete "P" and insert -- P1 --;

In Column 20, Line 11, delete "path:" and insert -- path; --;

In Column 24, Line 7, delete "packet:" and insert -- packet; --; and

In the Claims

In Column 27, Line 22 (approx.), Claim 16, delete "comprises at least two" and insert -- comprises --.

Signed and Sealed this
Fifth Day of May, 2020

Andrei Iancu
*Director of the United States Patent and Trademark Office*